US012685300B2

(12) United States Patent (10) Patent No.: US 12,685,300 B2
Gillihan (45) Date of Patent: *Jul. 21, 2026

(54) FISHING LURE

(71) Applicant: Captive Fishing Products, Inc.,
Sandwich, IL (US)

(72) Inventor: Michael A. Gillihan, Sandwich, IL
(US)

(73) Assignee: Captive Fishing Products, Inc.,
Sandwich, IL (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 17/493,704

(22) Filed: Oct. 4, 2021

(65) Prior Publication Data

US 2022/0095600 A1 Mar. 31, 2022

Related U.S. Application Data

(63) Continuation of application No. 15/296,875, filed on
Oct. 18, 2016, now Pat. No. 11,134,666.

(60) Provisional application No. 62/243,514, filed on Oct.
19, 2015.

(51) Int. Cl.
*A01K 83/06* (2006.01)
*A01K 97/05* (2006.01)

(52) U.S. Cl.
CPC .............. *A01K 97/05* (2013.01); *A01K 83/06*
(2013.01)

(58) Field of Classification Search
CPC ......... A01K 83/06; A01K 85/02; A01K 97/02
USPC ....................... 43/41, 44.2, 44.4, 44.99, 44.8
See application file for complete search history.

(56) References Cited

U.S. PATENT DOCUMENTS

| | | | | |
|---|---|---|---|---|
| 933,818 A | * | 9/1909 | Beatty .................... | A01K 83/06 43/41 |
| 2,205,472 A | * | 6/1940 | Fagerholm ............. | A01K 85/14 43/42.22 |
| 2,600,314 A | * | 6/1952 | Miner .................... | A01K 83/06 43/44.2 |
| 2,697,295 A | * | 12/1954 | Hinds .................... | A01K 83/06 43/44.8 |
| 3,688,430 A | * | 9/1972 | Balch .................... | A01K 85/01 43/41 |
| 3,991,504 A | * | 11/1976 | Pieper .................... | A01K 85/00 43/42.06 |
| 4,603,502 A | * | 8/1986 | MacDonald ........... | A01K 83/06 43/44.99 |
| 4,839,982 A | * | 6/1989 | Wood .................... | A01K 85/01 43/44.4 |
| 4,930,245 A | * | 6/1990 | Bazzano ................ | A01K 85/10 43/44.99 |
| 4,961,280 A | * | 10/1990 | Hudson .................. | A01K 83/06 43/44.99 |
| 5,319,875 A | * | 6/1994 | Brandolino ............ | A01K 85/01 43/44.99 |

(Continued)

*Primary Examiner* — David J Parsley
(74) *Attorney, Agent, or Firm* — Erickson Law Group, PC

(57) ABSTRACT

A bait cage assembly is provided for use in fishing. The
assembly includes a cage that is fixedly mounted on the hook
in such a way that the cage does not hinder the hooks ability
to impale game fish. The cage includes a pivotal back cover
user to open and close the cage for refilling with bait. In
addition, the cage is made up of material that is durable
enough to withstand the underwater environment, but is also
permeable enough to release the scent of the bait contained
inside.

11 Claims, 12 Drawing Sheets

(56) References Cited

U.S. PATENT DOCUMENTS

| | | | | |
|---|---|---|---|---|
| 5,581,933 A * | 12/1996 | Bommarito | ............ | A01K 85/01 |
| | | | | 43/44.99 |
| 6,247,260 B1 * | 6/2001 | Kandlbinder | .......... | A01K 83/06 |
| | | | | 43/44.4 |
| 7,028,430 B2 * | 4/2006 | Gironda | ................. | A01K 85/14 |
| | | | | 43/42.22 |
| 7,490,432 B2 * | 2/2009 | Gillihan | ................. | A01K 83/06 |
| | | | | 43/44.4 |

* cited by examiner

FIG. 19
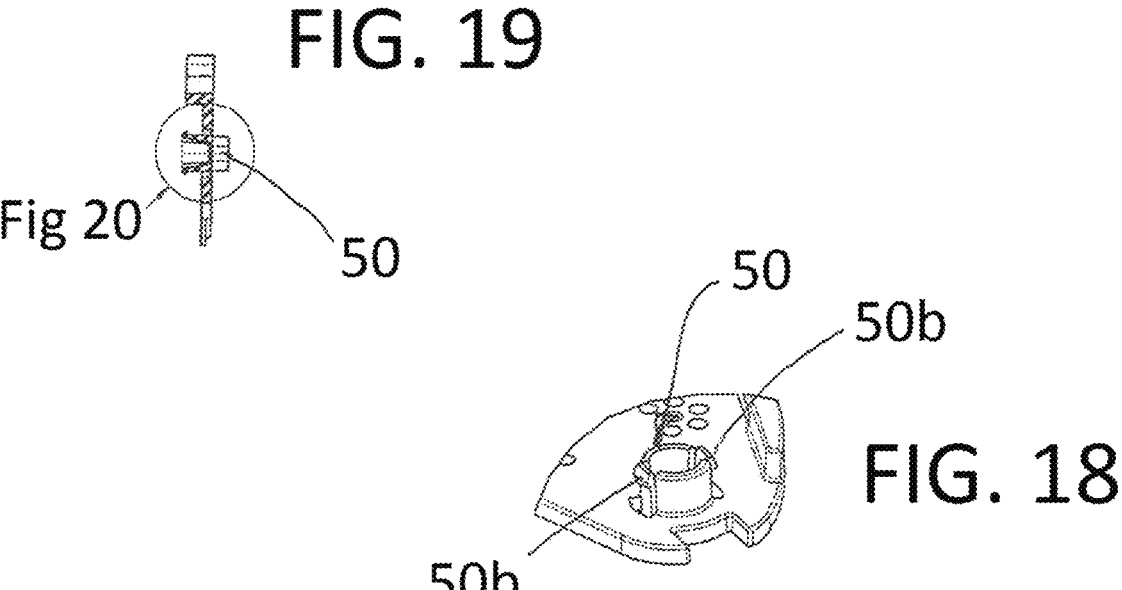
FIG. 18
FIG. 20
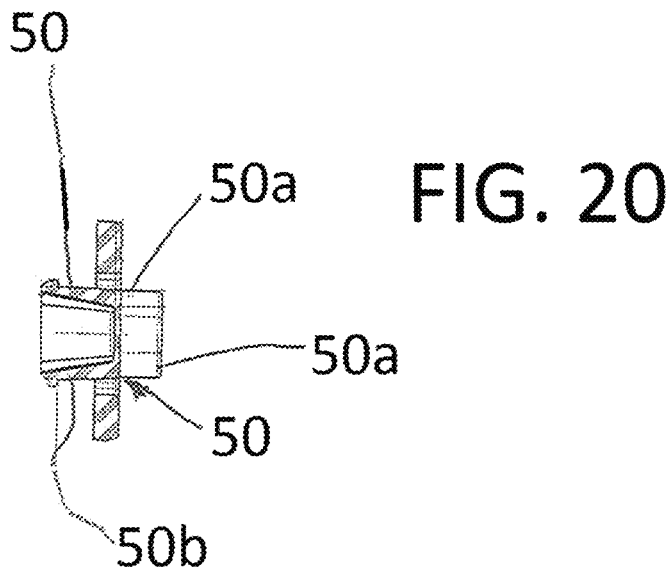

FISHING LURE

This application is a continuation of U.S. Ser. No. 15/296,875, filed Oct. 18, 2016, which claims the benefit of U.S. Provisional Application 62/243,514, filed Oct. 19, 2015.

BACKGROUND OF THE INVENTION

In fishing, there are many methods of attracting game fish, including live bait, artificial lures, and a combination of both. Often, artificial lures are used to imitate live prey and are designed to be drawn through the water. Other times, live bait is impaled on a hook and plunged into the water with hopes that its movement will attract predators. The use of live bait has proven to be more effective with certain types of game fish, such as catfish, because of its genuine smell and taste. A modification of this method has seen that it is advantageous to attach minced bait to the hook to minimize the chance that the bait will be lost to weeds or predators, while accentuating the authentic taste and smell.

When a fisherman desires to use live bait, the bait is typically impaled on a hook. However, by forcing the hook through the bait, the bait is thereby injured and will die relatively quickly. Once dead, the bait in incapable of independent movement and will not exhibit the distress signals that attract fish. Forcing a hook through the bait also weakens the tissue of the bait which makes the bait susceptible to falling off the hook.

In addition to the visual attraction of the bait, the scent and also the distress signals given off by small animals or insects are used by fish to locate food sources, and hence can be used to attract fish to a baited hook. A wide variety of pellets, which contain various scents intended to attract different fish are now available to fishermen. However, this bait is relatively expensive and difficult to retain on a conventional hook.

The present inventor has recognized the need to provide a fishing lure in which the bait is securely retained, and which improves the attractiveness of the bait to the fish.

If a bait animal or insect can be retained alive then it will continue to emit distress signals, e.g. vibrations of various frequencies which may or may not be audible to the human ear, that attract appropriate game fish. The present inventor has recognized the need to provide a fishing lure or bait holder in which live bait remains alive and intact for a lengthy period.

It is known to use an attachment apparatus, such as a permeable bag or basket, near the hook to secure the bait while releasing the desired attractants. Such apparatuses are described for example in U.S. Pat. Nos. 856,867; 2,780,021; and 5,319,875.

One problem with prior known bait devices is with the manual dexterity associated with placing the bait on the hook or in the cage or cavity while in a boat or standing in a stream in weather that is less than perfect. A fisherman's hands can get cold, wet and slippery from repeated dunking in the water or in releasing fish from the hook. Snapping and unsnapping the parts of a lure can be a difficult and a time-consuming operation.

Lures can undergo much stress during casting of the lure, reeling it through the water, and fighting a captured fish. In each of these situations, great stress is placed on the lure, especially on the assembled parts. The present inventor has recognized the need for a rugged and reusable bait device or lure.

The present inventor has recognized the desirability for a bait attachment cage that does not interfere or obstruct the effectiveness of the hook. In prior known bait bags, such as in U.S. Pat. Nos. 856,867 and 2,780,021, the bag engulfs the hook and may, on occasion, reduce the hook's likelihood of snaring the desired game fish.

The present inventor has recognized the desirability for providing a bait attachment cage that is easy to repeatedly open, refill and close, or open to clean. In prior known bait bags, the bag needs to be untied and retied in order to change the bait or to clean the bag. This is not an effortless task, especially when doing so after the bait has been dipped in cold water and exposed to muck and weeds.

The present inventor has recognized the desirability for a bait attachment cage that has significant longevity regardless of getting caught in weeds and being submerged in water for extended periods of time. Prior art bait bags, such as in U.S. Pat. No. 5,319,875 that are made of metal or contain metal parts may have reduced usability if extended exposure to water has caused rusted parts.

The present inventor has also recognized the desirability for a bait cage that is easily opened, filled and closed by a fisherman with limited manual dexterity, such as an elderly fisherman or one who has lost effective use of a hand.

SUMMARY OF THE INVENTION

The invention provides a rugged bait cage and hook combination. The invention provides a bait cage that can be filled with live bait or with bait food product. The invention provides a bait cage that is easily refilled by fishermen with limited manual dexterity.

The present invention provides an improved bait cage and hook combination comprising a cage for holding bait material and a hook connected to the cage. According to the invention the cage includes a pivotal back cover providing a re-closable opening.

According to the preferred embodiment of the invention, a bait cage and hook combination includes a cage having a water permeable cage body with a re-closable opening. A fishhook includes a hook shaft and a hook end portion extending from the hook shaft. The hook shaft is connected to the cage body with the hook end portion extending upward toward from the cage body.

Although the present invention is particularly advantageous for fishing catfish, it could also be advantageous for other type fishing as well such as commercial fishing, trout lines, etc.

Numerous other advantages and features of the present invention will be become readily apparent from the following detailed description of the invention and the embodiments thereof, and from the accompanying drawings.

BRIEF DESCRIPTION OF THE DRAWINGS

FIG. 18 is an enlarged, fragmentary perspective view taken from FIG. 14;

FIG. 19 is a fragmentary sectional view taken generally along line 19-19 of FIG. 14;

FIG. 20 is a is an enlarged sectional view taken from FIG. 19;

DETAILED DESCRIPTION OF THE PREFERRED EMBODIMENTS

Figure 1:
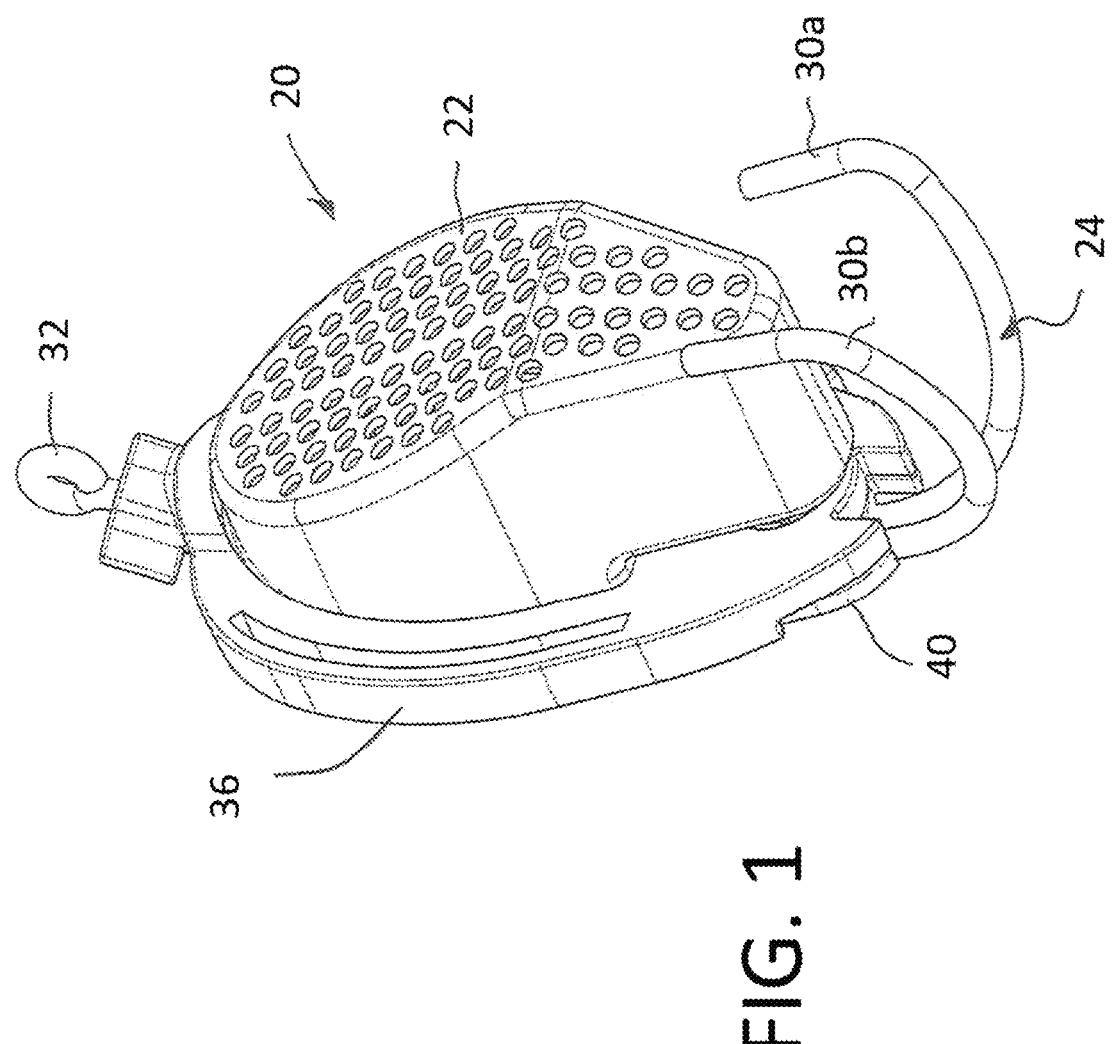
FIG. 1 is a front perspective view of the present invention bait cage and hook combination with the cage in the closed position.
Figure 2:
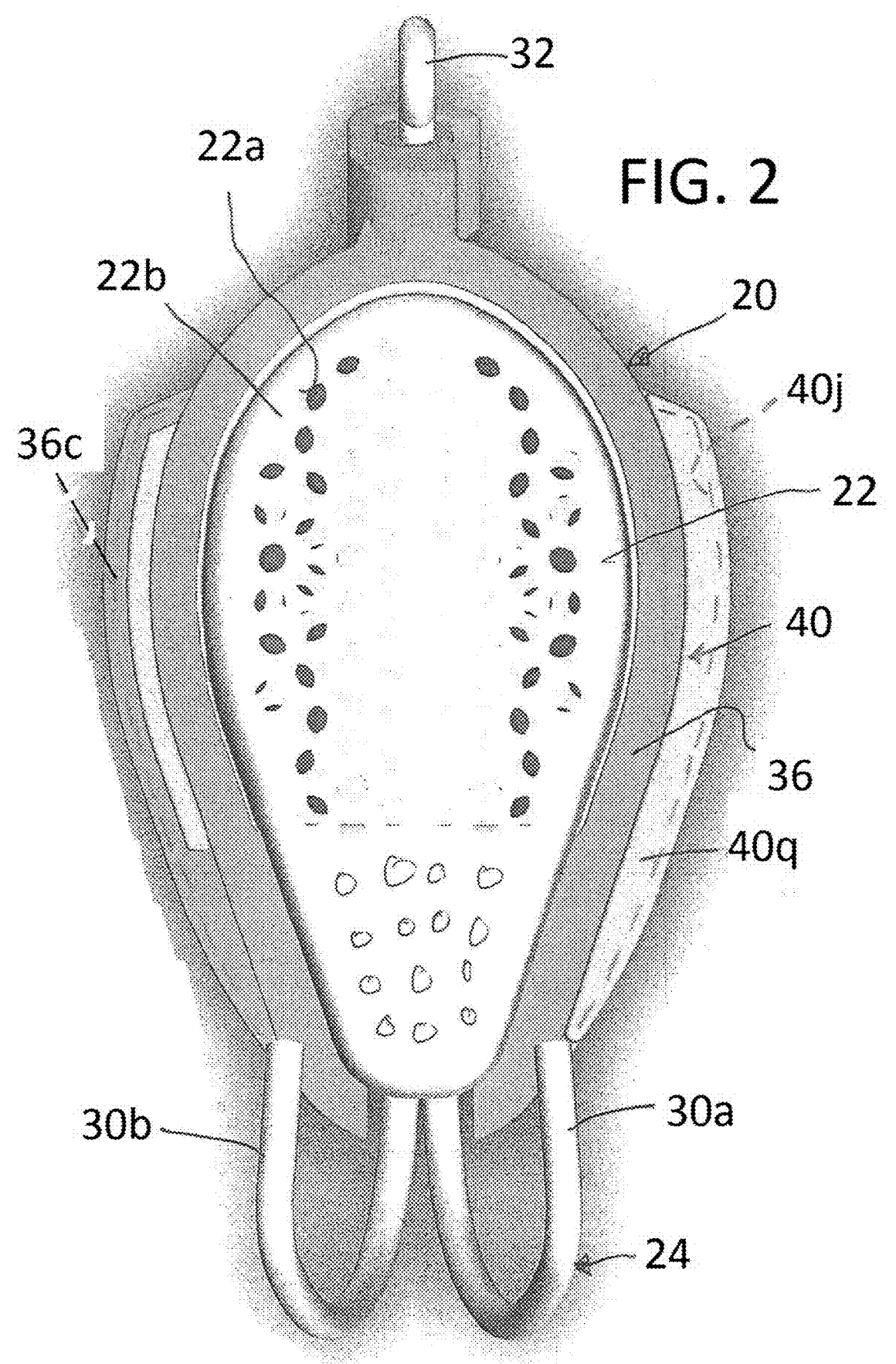
FIG. 2 is a front view of the bait cage and hook combination of FIG. 1.
Figure 3:
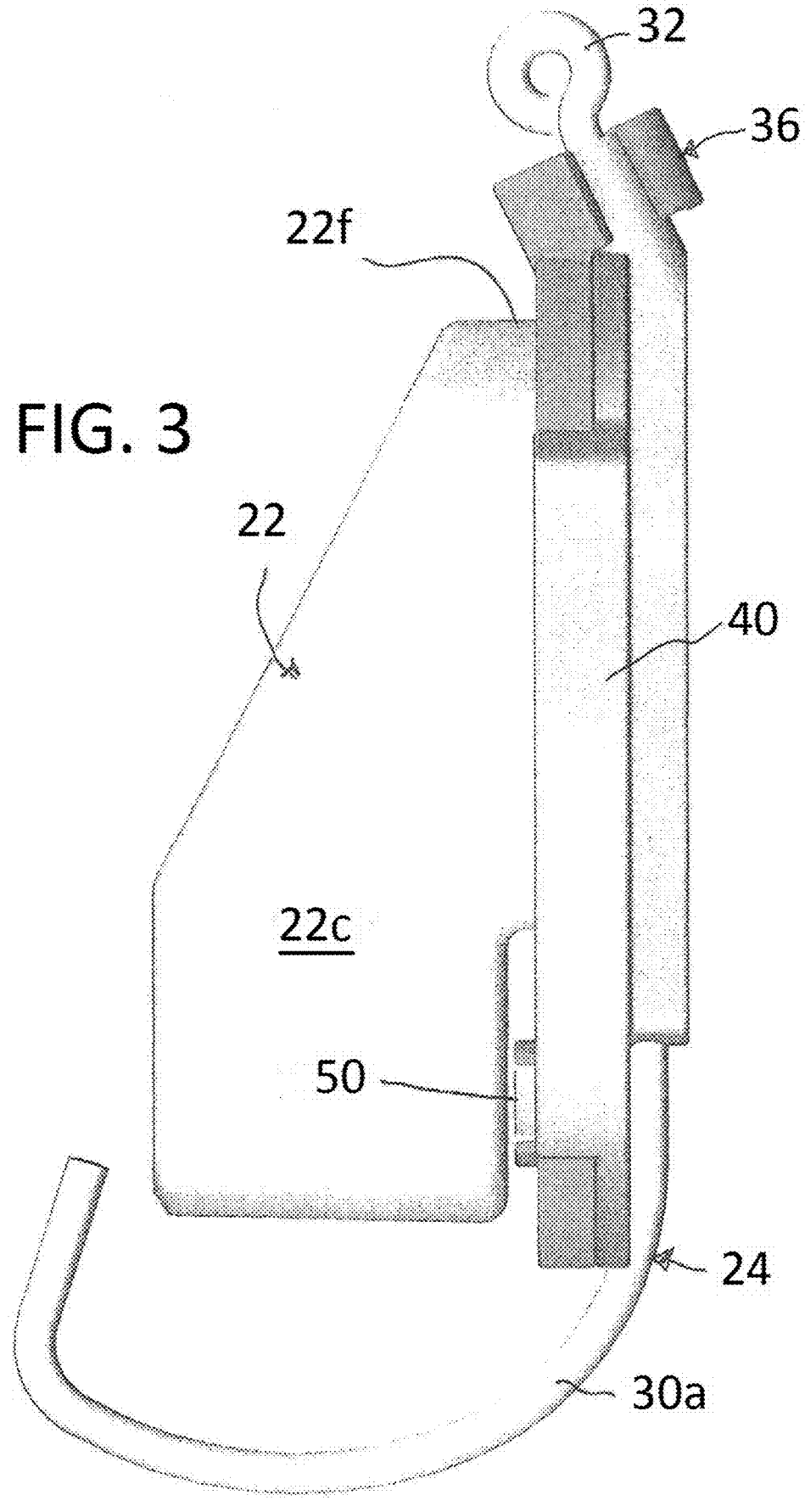
FIG. 3 is a right side view of the bait cage and hook combination of FIG. 1.
Figure 4:
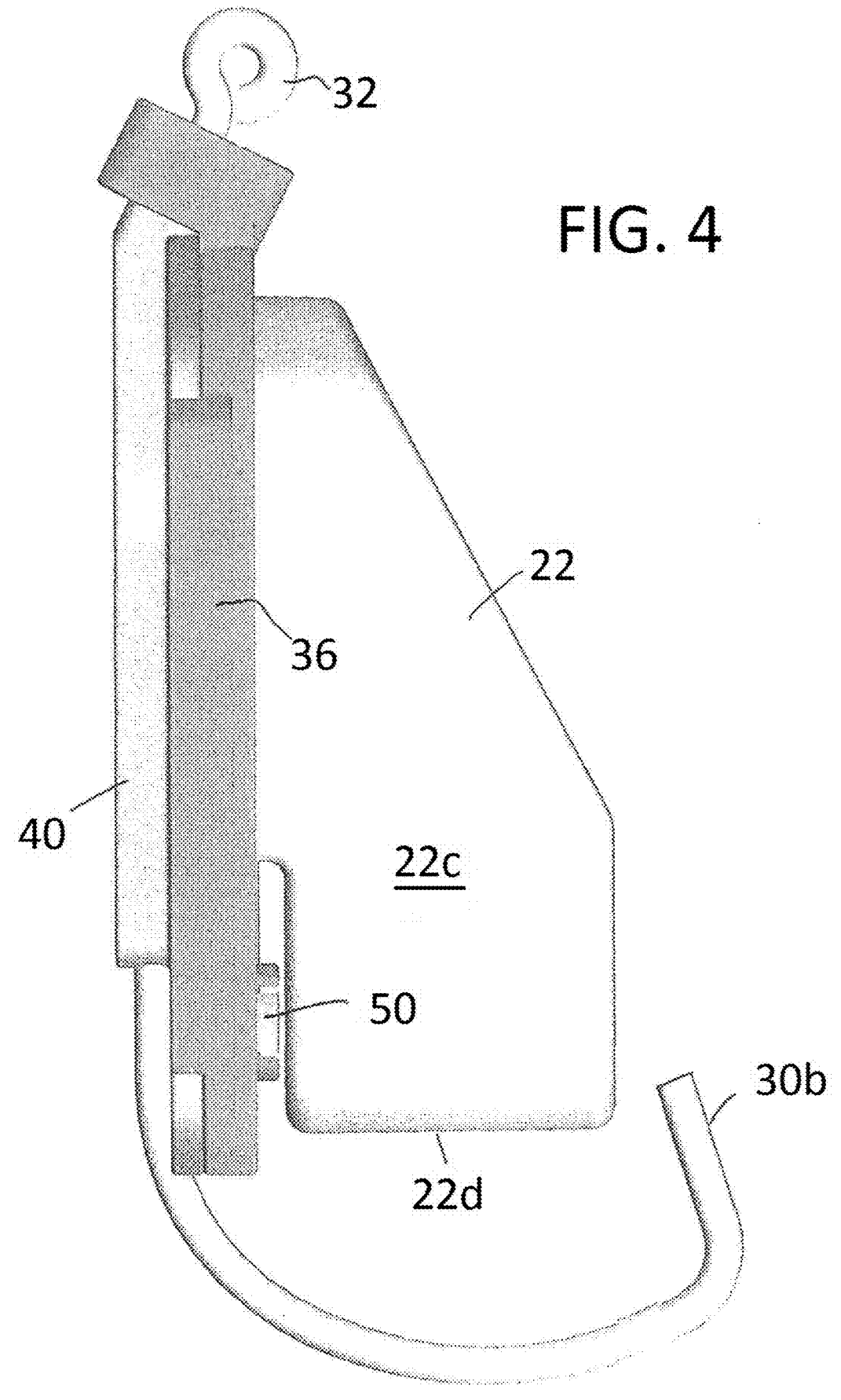
FIG. 4 is a left side view of the bait cage and hook combination of FIG. 1.
Figure 5:
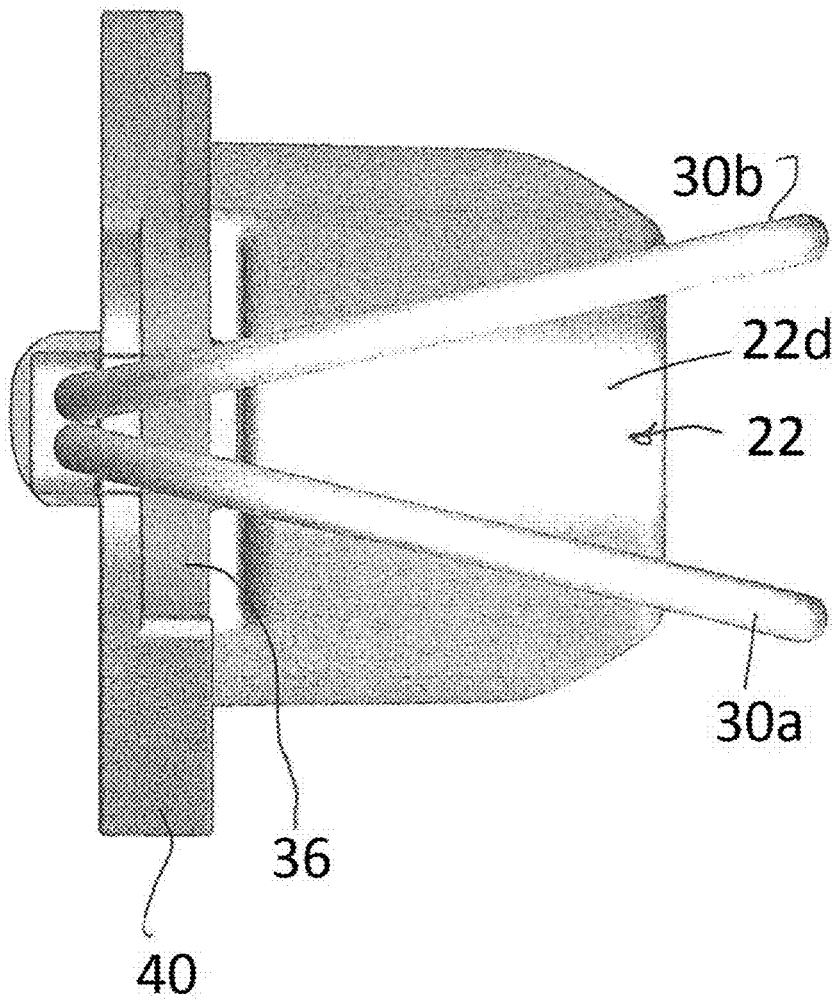
FIG. 5 is a bottom view of the bait cage and hook combination of FIG. 1.
Figure 6:
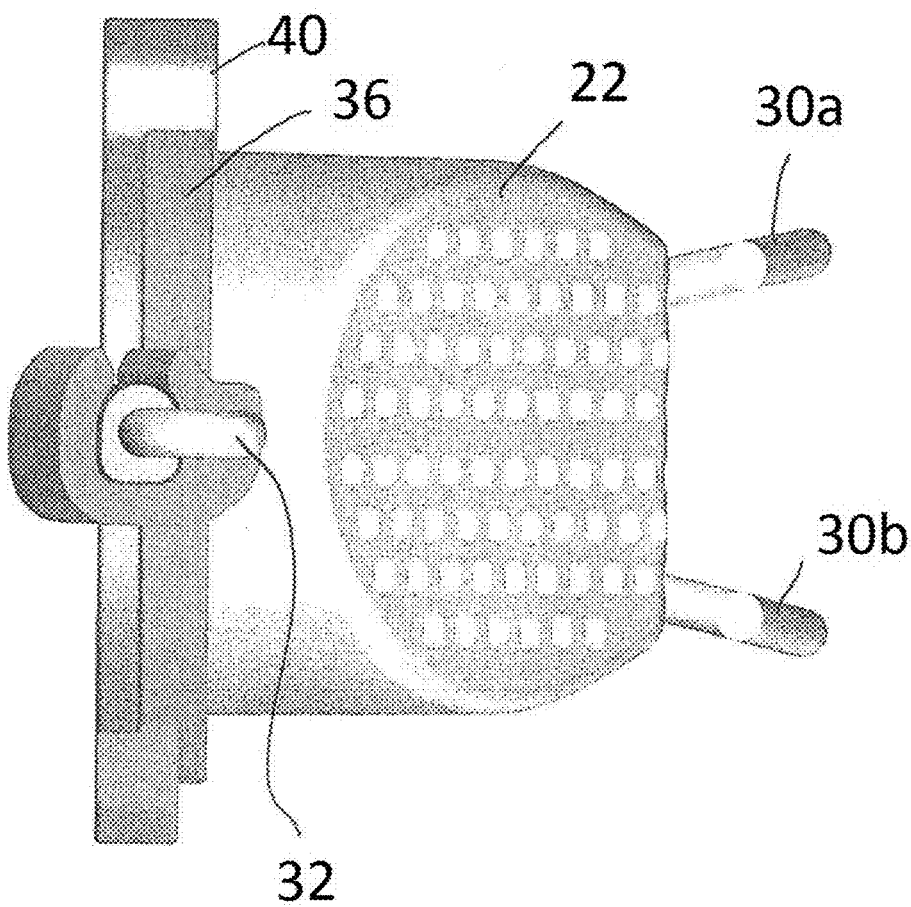
FIG. 6 is a top view of the bait cage and hook combination of FIG. 1.
Figure 7:
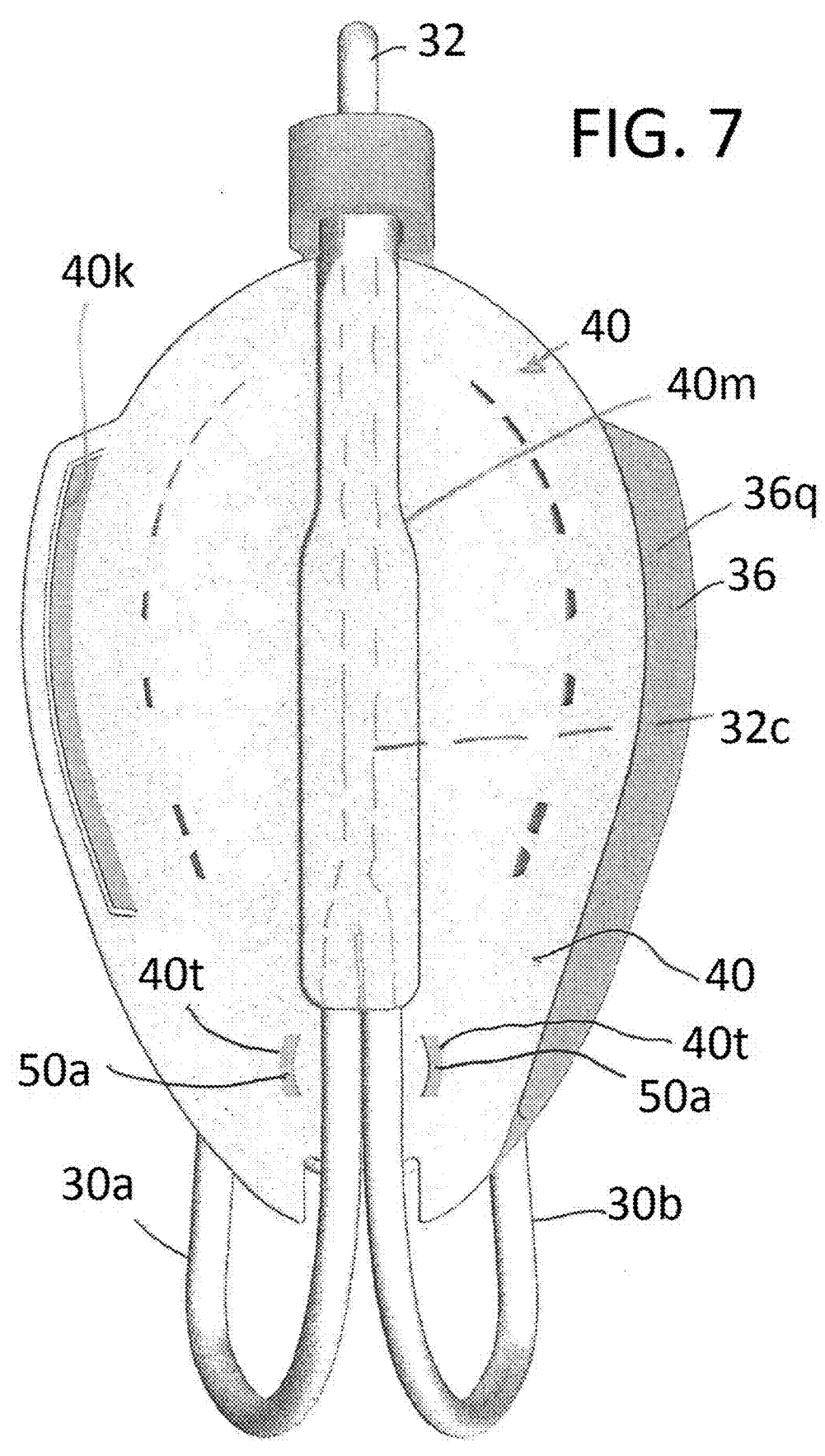
FIG. 7 is a back view of the bait cage and hook combination of FIG. 1.
Figures 8, 9, 10, 11:
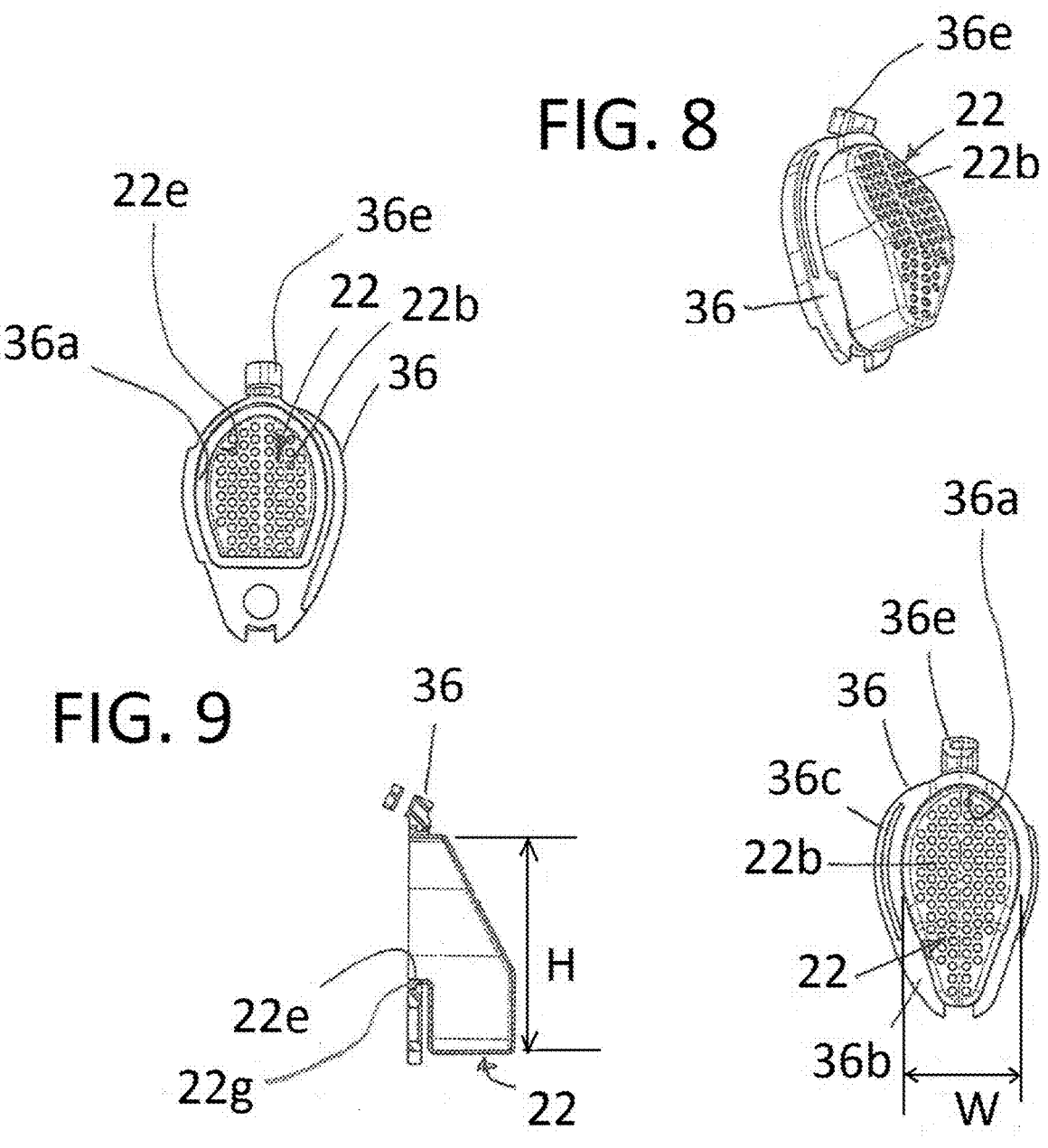
FIG. 8 is a front perspective view of a portion of the combination of FIG. 1.
FIG. 9 is a rear view of the portion shown in FIG. 8.
FIG. 10 is a front view of the portion shown in FIG. 8.
FIG. 11 is a sectional view taken generally along line 11-11 of FIG. 10.
Figure 12:
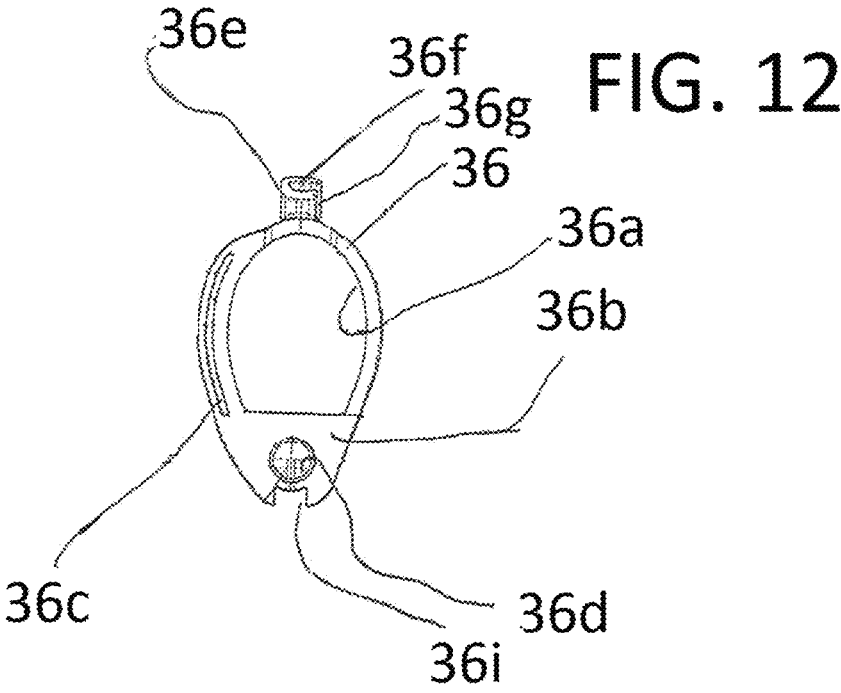
FIG. 12 is a front view of a keeper portion of the combination of FIG. 1.
Figure 13:
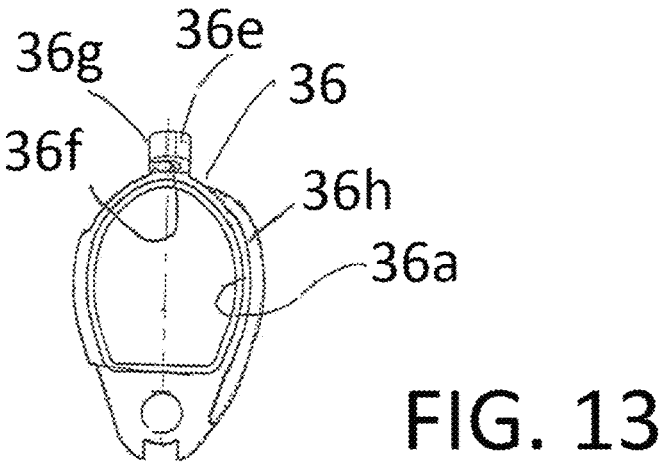
FIG. 13 is a rear view of the keeper portion of the combination of FIG. 12.
Figure 15:
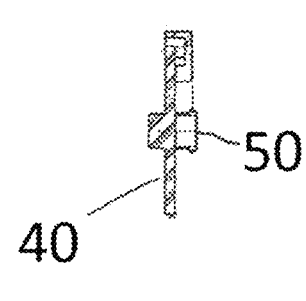
FIG. 15 is a sectional view taken generally along line 15-15 of FIG. 14.
Figure 14:
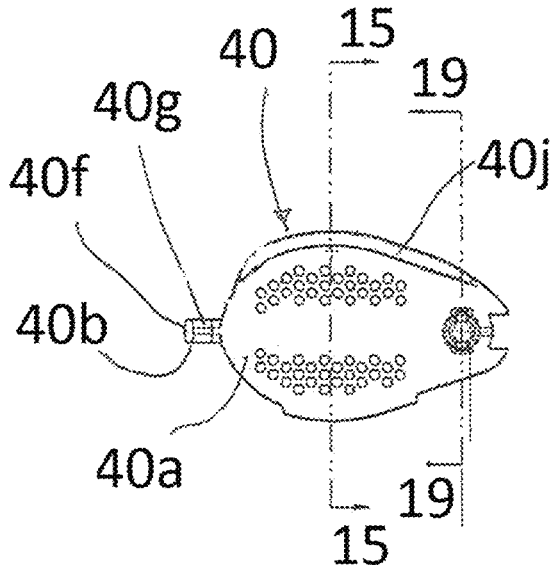
FIG. 14 a front view of a back portion of the combination of FIG. 1.
Figure 17:
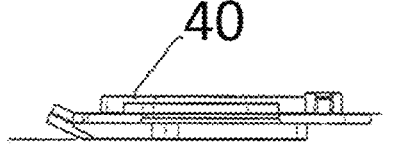
FIG. 17 is side view of the back portion of FIG. 14.
Figure 16:
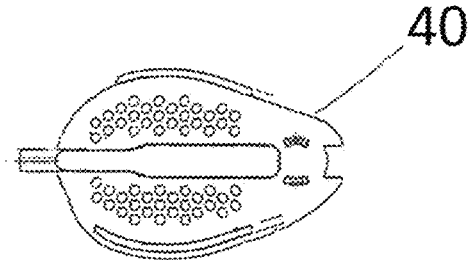
FIG. 16 is a rear view of back portion of the combination of FIG. 14.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This specification incorporates by reference U.S. Ser. No. 15/296,875, filed Oct. 18, 2016 and U.S. Provisional Application 62/243,514, filed Oct. 19, 2015, in their entireties.

FIG. 1 illustrates a bait cage and hook assembly 20 having a cage body 22 and a hook 24. The cage body 22 comprises a perforated, soft material, such as silicone or nitrile. Alternately, the cage body could be a woven bag. The hook 24 includes dual hook barbs 30*a*, 30*b* and a hook eye 32 for attaching fishing line. Although the hooks are shown with blunt ends, it is to be understood that the ends would be sharp with barbs as known in the art. The cage body 22 is mounted to a keeper or frame 36. A back cover 40 is held by the keeper 36. The hook can be a metal hook such as stainless steel molded into the back cover. A ceramic hook is also possible.

FIGS. 2-20 illustrate the assembly 20 of FIG. 1 in more detail. The cage body 22 has holes or perforation 22*a* on a front face 22*b* thereof. The side walls 22*c* and bottom wall 22*d* are solid but could also have perforations. The back side of the cage body 22 has an opening 22*e* for insertion of bait.

The cage body 22 has an approximate inverted L-shaped side profile and an upper portion 22*f* is sized and shaped and has an outwardly turned flange 22*g* to fit snugly into a compatibly shaped, counter sunk opening 36*a* in the keeper 36. The upper portion is fit through the back of the keeper such that the flange 22*g* of the portion 22*f* fits into the counter sunk opening 36*a* to be flush with a back surface of the keeper. The cage body upper portion 22*f* is secured within the counter sunk opening 36*a* by adhesive or other means.

The keeper 36 includes a front surface 36*b* that reveals on one side a curved longitudinal slot 36*c* and a bottom aperture 36*d*. The keeper has a hook clearance notch 36*i* on the bottom adjacent the aperture 36*d*. A collar portion 36*e* is formed on a top of the keeper 36. The collar portion 36*e* has a longitudinal passage 36*f* intersecting a lateral slot 36*g* that also extends longitudinally. The passage 36*f* can be circular, rectangular, rounded-rectangular, or other compatible shape. The lateral slot 36*g* allows the bushing portion 40*b* of the back cover (described below) to resiliently snap into the collar for assembly and to be held thereby. The keeper 36 includes a longitudinally elongated and curved stop wall 36*h* on a back side thereof, hidden beneath a cover wall portion 36*q*, and adjacent to the slot 36*c*.

The back cover 40 includes a perforated plate portion 40*a* having perforations 41*a* molded with the bushing portion 40*b* at a top end. The bushing portion 40*b* has a circular longitudinal passage 40*f* intersecting a lateral slot 40*g* that also extends longitudinally. The lateral slot 40*g* allows the eye portion 32 of the hook to snap into the bushing portion 40*b* for assembly. Alternately, the eye portion of the hook can be molded into the bushing portion or molded with the bushing portion. The bushing portion 40*b* can be molded around a hook shaft 32*c* by a central, longitudinal rib 40*m*, or the hook can be molded integrally with the back cover 40, i.e., no actual hook shaft within the rib 40*m*. The back cover 40 includes a longitudinal, curved stop wall 40*j* on a front side thereof, hidden beneath a cover wall portion 40*q*, and adjacent a longitudinal, curved slot 40*k*.

A hinge pin or rivet 50 is used to rotatably connect the back cover 40 to the keeper 36. The illustrated hinge pin is tubular. The hinge pin 50 can be a separate piece that is snapped to the back cover 40 using prongs, or adhesively or otherwise secured to the back cover 40 or can be molded with the back cover 40. The illustrated embodiment shows a back end of the hinge pin 50 having two curved tangs 50*a* that are fit into curved slots 40*t* in the back cover and secured thereto by adhesive. The front end of the hinge pin 50 has hooks or prongs 50*b* that can be snap fit into the aperture 36*d* of the keeper 36 when the back cover 40 is assembled to the keeper 36.

Figure 21:
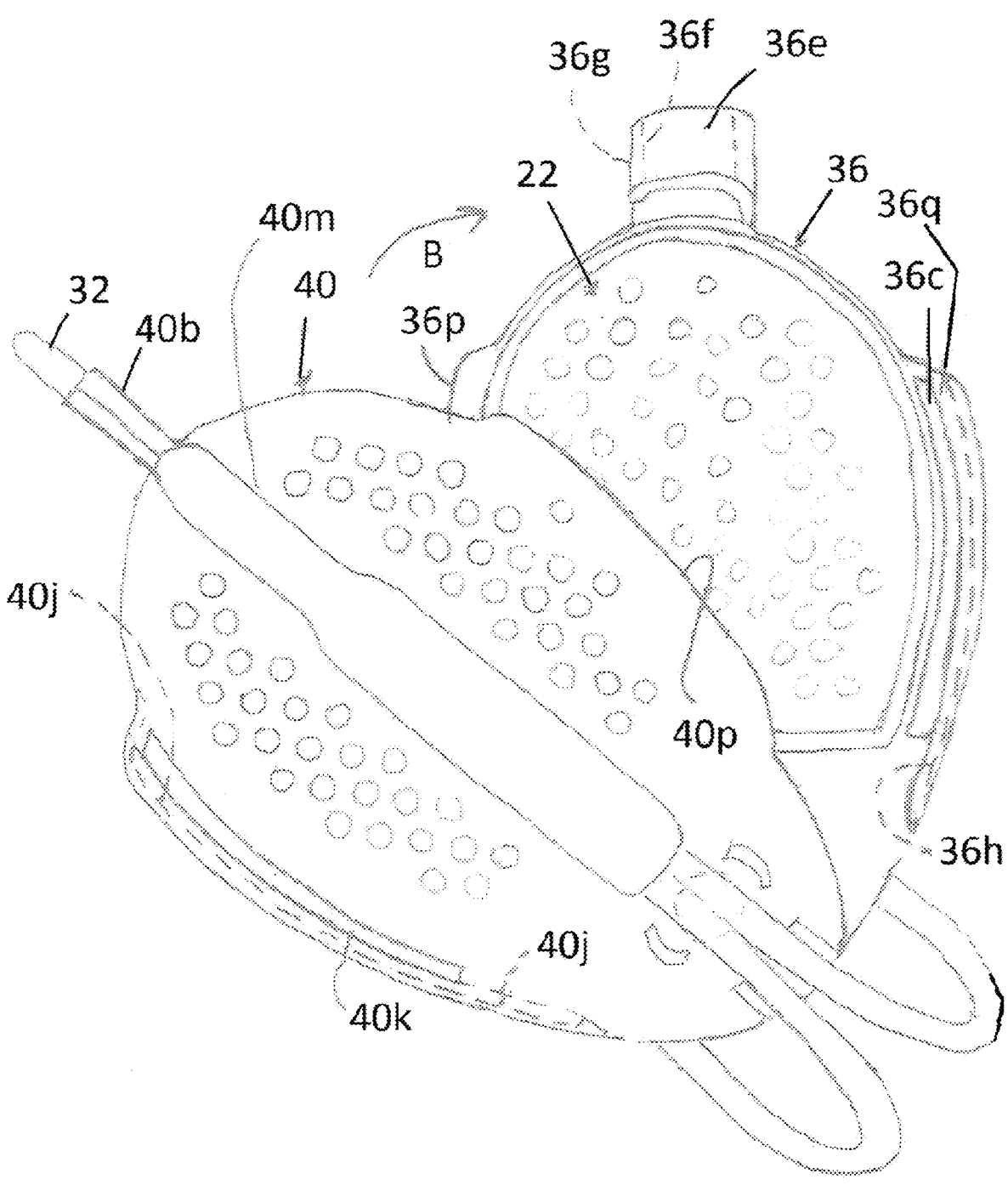
FIG. 21 is a rear view of the assembly of FIG. 1 showing an opened position of the back cover.

As shown in FIG. 21, when the back cover 40 is closed to the keeper 36, the cover 40 is pivoted about the hinge 50 in the rotary direction 13 in FIG. 21. A portion of the adjacent side edge 40*p* of the cover 40 fits beneath the cover wall portion 36*q* and contacts the wall 36*h* of the keeper 36. Simultaneously, the adjacent side edge 36*p* of the keeper 36 fits beneath the cover wall portion 40*q* of the back cover 40 and contacts the wall 40*j* of the back cover 40. Simultaneously, the bushing portion 40*p* of the back cover 40 resiliently snaps into the collar 36*e* of the keeper. The gripping of the bushing portion 40*p* by the collar portion 36*e* functions as a clasp to keep the back cover 40 in the closed position with respect to the keeper 36 after bait is loaded into the housing body 22.

The keeper 36 and back cover 40 can be a rigid material, such as a plastic, such as polypropylene material.

The function of the slot 36*c* on the keeper 36 and the slot 40*k* on the back cover 40 is to provide openings for muck to be flushed away to prevent muck from building up between the keeper and the back cover. Alternately, a raised curved ridge can be provided on the surface opposite each slot 36*c*, 40*k* that, when the back cover is closed to the keeper, snaps into the respective slot 36*c*, 40*k* to provide additional latches to hold the cover 40 in the closed position to the keeper 36.

According to one exemplary embodiment, the cage body 22 has a height H (FIG. 11) of about 1.6 inches, a width W (FIG. 10) of about 0.8 inches, a volume of about 0.4 cubic inches within the cage body 22, and the rear opening 22*e* into the cage body has an open area of about 0.7 square inches. On a front face, the cage body 22 has about 90 apertures 22*a*, each aperture having a diameter D of about 0.06 inches. The rear cover 40 has about 54 apertures 41*a* into the cage body, each aperture having a diameter of about 0.06 inches.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A bait cage assembly, comprising:
   a hook; and
   a cage mounted to the hook and having a water permeable cage body, the cage body having a re-closable opening for inserting bait into the cage body, said cage comprising a pivotable back cover and operable to open and close said re-closable opening;
   said cage body being substantially composed of a soft material and having a plurality of spaced-apart holes allowing water to pass through the cage body while in use;
   a keeper holding the cage, and the pivotable back cover pivotally connected to the keeper and connected to the hook;
   a clasp between the keeper and the back cover for holding the back cover and keeper in the closed position; and
   wherein the clasp surrounds a portion of the hook.

2. The assembly according to claim 1, wherein the back cover and keeper are composed of rigid plastic.

3. The assembly according to claim 2, wherein the hook is molded into the back cover.

4. The assembly according to claim 2, wherein the hook has a curved hook end that is below and in front of the cage.

5. The assembly according to claim 1, wherein the soft material is composed of silicone or nitrile.

6. The assembly according to claim 1, wherein the cage body substantially has an L-shape.

7. A fishing lure assembly, comprising:
   a cage body and a hook, the cage body mounted to a frame, a back cover is held by the frame, the cage body has a plurality of spaced-apart holes on a front face thereof allowing water to pass through the cage body while in use, a back side of the cage body has a cage body opening for insertion of bait, the hook connected to the frame, the back cover configured to selectively close the opening for insertion of bait;
   said cage body being substantially composed of a soft material; and
   wherein the cage body has an approximate inverted L-shaped side profile and an upper portion is sized and shaped to fit snugly into a compatibly shaped, opening in the frame.

8. The assembly according to claim 7, wherein the hook is molded integrally with the back cover.

9. The assembly according to claim 7, wherein the hook is connected to the back cover.

10. The assembly according to claim 7, wherein the soft material is composed of silicone or nitrile.

11. A fishing lure assembly, comprising:
   a cage body and a hook, the cage body mounted to a frame, a back cover is held by the frame, the cage body has a plurality of spaced-apart holes on a front face thereof allowing water to pass through the cage body while in use, a back side of the cage body has a cage body opening for insertion of bait, the hook connected to the frame, the back cover configured to selectively close the opening for insertion of bait;
   said cage body being substantially composed of a soft material; and
   wherein the cage body includes an outwardly turned flange surrounding the cage body opening and the frame includes a counter sunk frame opening sized to snugly receive the outwardly turned flange, and the cage body is retained to the frame by the outwardly turned flange abutting a back surface of the frame within the counter sunk frame opening.

\* \* \* \* \*